(12) United States Patent
Arroyo et al.

(10) Patent No.: US 8,725,549 B2
(45) Date of Patent: May 13, 2014

(54) SYSTEM AND BUSINESS METHOD FOR WORK-FLOW REVIEW AND MANAGEMENT

(75) Inventors: Fernando J. Arroyo, Stafford, VA (US); Don Fernandez, Round Hill, VA (US)

(73) Assignee: GeoLogics Corporation, Alexandria, VA (US)

(*) Notice: Subject to any disclaimer, the term of this patent is extended or adjusted under 35 U.S.C. 154(b) by 2677 days.

(21) Appl. No.: 10/217,019

(22) Filed: Aug. 13, 2002

(65) Prior Publication Data

US 2003/0033167 A1    Feb. 13, 2003

Related U.S. Application Data

(60) Provisional application No. 60/311,352, filed on Aug. 13, 2001.

(51) Int. Cl.
*G06Q 10/00* (2012.01)

(52) U.S. Cl.
USPC ....... 705/7.27; 705/7.13; 705/7.14; 705/7.15; 705/7.16

(58) Field of Classification Search
USPC .............. 705/1.1, 7.13, 7.14, 7.15, 7.16, 7.27
See application file for complete search history.

(56) References Cited

U.S. PATENT DOCUMENTS

| | | | | |
|---|---|---|---|---|
| 5,315,504 A * | 5/1994 | Lemble | ........................... | 700/90 |
| 5,754,857 A * | 5/1998 | Gadol | ........................... | 709/203 |
| 5,867,824 A * | 2/1999 | Saito et al. | ........................ | 705/9 |
| 5,926,100 A * | 7/1999 | Escolar | ........................ | 340/691.3 |
| 6,038,573 A * | 3/2000 | Parks | ........................... | 715/513 |
| 6,704,906 B1 * | 3/2004 | Yankovich et al. | ............ | 715/222 |
| 2002/0069099 A1 * | 6/2002 | Knox et al. | ........................ | 705/8 |
| 2002/0087479 A1 * | 7/2002 | Malcolm | ........................ | 705/64 |
| 2002/0133395 A1 * | 9/2002 | Hughes et al. | ................... | 705/11 |
| 2003/0153991 A1 * | 8/2003 | Visser et al. | ..................... | 700/79 |
| 2004/0151294 A1 * | 8/2004 | Baniak et al. | ............. | 379/211.01 |

OTHER PUBLICATIONS

Google Patent Searches U.S. Appl. No. 10/217,019, filed Dec. 16, 2013, 2 pages.*
Williams, T., The Effect of Design Changes and Delays on Project Costs, Journal of the Operation Research Society 46,7, 1995, pp. 809-818.*
Georgakopoulos, D., An Overview of Workflow Management: From Process Modeling to Workflow Automation Infrastructure, Distributed and Parallel Databases, 1995, pp. 119-152.*

* cited by examiner

*Primary Examiner* — Dean T Nguyen
(74) *Attorney, Agent, or Firm* — Venable LLP; Jeffri A. Kaminski; Todd R. Farnsworth

(57) ABSTRACT

A method in a computer system for paperless business workflow review and management includes the steps of: creating an interactive document electronically; entering the interactive document into a document entry stage; electronically submitting the interactive document to a first approval level from the document entry stage, when such approval is required by a set of business rules; approving the submitted interactive document; for N levels of approval, iteratively submitting the interactive document electronically to the next approval level, up to level N, when the interactive document is approved at the previous approval level; returning the interactive document to the document entry stage when the interactive document is rejected at any of the first through N approval levels; electronically processing the interactive document at the processing level when the interactive document is approved at all required approval levels; verifying the electronic processing of the interactive document; and archiving the interactive document. When multiple approvals of the interactive document are required at an approval level, approval takes place in parallel by all of the approvers at that level.

23 Claims, 10 Drawing Sheets

SYSTEM AND BUSINESS METHOD FOR WORK-FLOW REVIEW AND MANAGEMENT

CROSS-REFERENCE TO RELATED APPLICATION

The present application is related to U.S. Provisional Patent Application No. 60/311,352, filed Aug. 13, 2001, entitled "System and Business Method for Workflow Review and Management," to Arroyo et al., the contents of which are incorporated herein by reference in their entirety.

BACKGROUND OF THE INVENTION

1. Field of the Invention

The present invention relates generally to business methods and more particularly to service industry back-end automation.

2. Related Art

In the products industry, there exist many electronic (e-business) solutions to automating transactions occurring at every point along the supply chain and in the manufacturing cycle. For example, customers can purchase goods from a store through the Internet with credit cards. The store's distribution centers can automatically start order fulfillment, update their inventories and order more stock. Payments can be made electronically from the credit companies to the store's bank. All of these solutions, and others, help to improve efficiency, decrease the cost of business, reduce errors, and improve customer satisfaction.

In the services industry, however, there are no analogous e-business solutions. There are electronic solutions at different points in the process of labor to payment, but there are no integrated solutions that allow the entire process to proceed electronically and without paper. Where the primary unit of measure is a labor hour, there is no completely electronic way to collect time worked, validate the time worked, approve the charged time, bill the client, collect payment, correct incorrect time charged, reconcile payments to time charges, and so on.

For example, those who work in the services industry fill out a timesheet, either on paper or electronically. Electronic timesheets are then usually printed on paper. Time sheets must be signed by the worker, then usually approved by those higher up in the corporate structure, such as team leads, group managers, division heads etc. However, only one person can review and approve a paper document at a time, and typically only person at each level is responsible for reviewing and approving the document. If an employee works on different projects for different managers, only one manager will approve the timesheet. A manager might not therefore be able to see or approve all charges for his project if the employee reports to another manager for timesheet approval. Even worse, someone not related to any of the employee's projects may be the one approving the charges. If approval from managers outside of the employee's organization is required, they must view the timesheet in the employee's format, which may not contain account numbers that are meaningful to the external organization.

The manual process of review and approval takes a great deal of time. Eventually the timesheets make their way to an accounting department, where the charges to various accounts must be collected and invoiced to the customers. Travel and other direct expenses (ODCs) are billed in the same way as timesheets, and cause similar difficulties.

Correcting timesheets and other documents can be cumbersome and timeconsuming. Traditional methods often include having to print out a copy of the incorrect document, having the document owner indicate all changes by hand in ink, signing off on each change and then sending the corrected document back through the chain of approval. This can significantly delay correct billing of the customer.

A worker who works with several different clients may have their time appear on separate invoices. However, a service company usually wants to keep its clients hidden from each other. If an individual employee's timesheet had to be forwarded to a client, for instance in the case of a charge dispute, it would be undesirable to include that worker's single complete timesheet showing information for all clients. One conventional solution to this problem is to print out the timesheet, and to physically black-out the time entries that do not belong to the disputing client.

In addition to these challenges, companies each define their work-week and their billing schedules differently. Company A may define their work week from Saturday to Friday and have a bi-weekly billing schedule, while Company B may have a Monday to Sunday work week and a monthly billing schedule. If employees from Company B are contracted to work for Company A, reconciling time charges becomes even more complicated because the time periods do not match up exactly.

Further, in the services industry, a set of companies in a working relationship with each other may have different roles with respect to each other, sometimes simultaneously. One division of Company A could contract work out to Company B, while another division of Company B has sub-contracted work to another division of Company A. In a third arena, Companies A and B could be competitors. Sharing data among becomes problematic because each company also wants to preserve their confidential records while at the same time sharing information to ease data processing. Each company has its own accounting systems, time periods, client codes and other internal differences that make reconciliation of data and charges difficult and time-consuming. Further, delays resulting from the difficulty of sharing information can mean that the companies are unable to meet their reporting requirements to each other, because the data for the reports are not available due to the delays.

Other drawbacks to the traditional electronic and paper workings of the service industry back-end are the problems inherent in the long delays between invoice and payment. Although the worker is paid at each pay period, the actual funds from the invoice for the work done may not be paid by the clients for weeks, or even months, after the work was done. This is because, at the client-end, the invoices must go through the client's back-end accounting structures as well.

Another consequence of the long delay between invoice and billing is that project managers can rarely get an up-to-date view of the state of their projects. This causes the potential for budget overruns and shortfalls. Further, at the corporate level, the organization cannot see a timely picture of how much revenue is being generated or how current costs are affecting the bottom line. This problem is exacerbated in tiered working relationships between companies, due to the significant delays caused by the manual sharing of data.

Finally, the services industry must often adhere to a number of government regulations, especially if a government agency is itself involved as part of the network of entities on a project. It can be very difficult to ensure that the regulations are adhered to at all points in the work flow when a complete picture of work done is not readily and timely available. Such regulation requirements include maintaining document integrity and ensuring that only the timekeeper makes entries into timesheets; making daily time-entries; tracking the history of the document; and allowing only formal signatures by the timekeeper and managers.

What is needed then, is an electronic solution that allows real-time management and review of service industry work flows.

SUMMARY OF THE INVENTION

In an exemplary embodiment of the present invention a system and business method for work flow review and management is disclosed.

The business method and system of the present invention allows service companies to accelerate key transactions and increase their cash flow, and to increase profitability by significantly reducing "back-office" costs. In addition, the present invention can enhance operational effectiveness, especially in the areas of management, visibility, and reporting. The present invention also facilitates partnering with external organizations, and the operation of virtual and highly distributed organizations.

In an exemplary embodiment of the present invention, all critical business processes such as time and expense reporting, invoicing, payment and reconciliation are automated and integrated. The related business documents, such as timesheets, expense reports, personnel actions, and invoices are created, edited, tracked and stored electronically, although they can also be printed on paper when needed. The restructuring and automation of these critical business processes reduces the time spent both on filling out and reviewing documents, and the time spent on moving the document through such processes from days or weeks to minutes. These documents can be implemented according to the already established paper forms that a user organization may have in place. This can improve adoption of the present invention by decreasing resistance to the implementation of a new system, requiring less training on how to use the system, because the users are already familiar with the paper versions of the documents, and, if any of the organization's clients refuse to use electronic forms, the organization will have the option to revert to the paper medium.

In an exemplary embodiment of the present invention, all types of labor and materials, such as the labor hours of full- and part-time employees, consultants, subcontractors, and their travel expenses are tracked and stored in a central repository, available to all employees and partners at the level of access appropriate for each role. Once captured, all labor-related data can be presented in any user-customizable form. For example, labor records can be viewed as timesheets or as invoices. Each organization and role can view the data in the context of the organization and role, making the differences in accounting systems, client codes, time periods, etc. transparent to the viewer.

The present invention can fully integrate the back-offices of the full service-industry "supply-chain", including clients, subcontractors, independent consultants, banks, and auditors. The full integration allows all labor-related costs to be tracked by all in the supply chain in real time. The real-time tracking of cost data can prevent budget overruns and other "surprises" caused by traditional time-delayed reporting systems.

In an exemplary embodiment of the present invention, many e-business methodologies that have been already proven in the products industry are applied to the services industry. In addition, the methods of the best practices of the services industry are provided as a default, while the present invention as a whole remains completely customizable to work with existing back-office systems.

The automation of the back-office business processes and the use of the services industry's best practices can significantly reduce internal costs, improve process integrity, and enhance business relationships while accelerating cash flow.

In an exemplary embodiment, the present invention can be a computer based system for business work-flow review and management, including: a central repository that stores work-flow data; a plurality of business rules stored in the central repository; a plurality of clients associated with different organizations interfacing with the central repository; a first graphical user interface (GUI) operating on a first client that displays and allows modifications to a subset of the stored work-flow data in a first interactive document according to a first subset of the business rules applicable to a first user operating the first client, wherein the modifications include at least one of editing, submitting, unsubmitting, rejecting, unrejecting, approving, unapproving, archiving, and restoring the first interactive document; and a second GUI operating on a second client that displays and allows modifications to the subset of the stored work-flow data in a second interactive document according to a second subset of the business rules applicable to a second user operating the second client, wherein the modifications include at least one of editing, submitting, unsubmitting, rejecting, unrejecting, approving, unapproving, archiving, and restoring the second interactive document.

In another exemplary embodiment, the present invention can be a computer program product embodied on a computer usable medium comprising program logic to be executed on a computer, the program logic including: means for storing work-flow data and business rules in a central repository; means for selecting a subset of the workflow data from the central repository according to the business rules using a first graphical user interface (GUI) operating on a first client; means for displaying in the first GUI the selected subset of work-flow data in a first interactive document on the first client; means for modifying the displayed subset of work-flow data using the first GUI, wherein the modifications include at least one of editing, submitting, unsubmitting, rejecting, unrejecting, approving, unapproving, archiving, and restoring; means for storing the modified displayed subset of work-flow data using the first GUI; means for selecting the subset of the work-flow data from the central repository according to the business rules using a second GUI operating on a second client; and means for displaying in the second GUI the selected subset of work-flow data in a second interactive document on the second client.

In another exemplary embodiment, the present invention can be a method for electronic business work-flow review and management including the steps of: storing work-flow data and business rules in a central repository; selecting a subset of the workflow data from the central repository according to the business rules using a first graphical user interface (GUI) operating on a first client; displaying in the first GUI the selected subset of work-flow data in a first interactive document on the first client; modifying the displayed subset of work-flow data using the first GUI, wherein the modifications include at least one of editing, submitting, unsubmitting, rejecting, unrejecting, approving, unapproving, archiving, and restoring; storing the modified displayed subset of work-flow data using the first GUI; selecting the subset of the workflow data from the central repository according to the business rules using a second GUI operating on a second client; and displaying in the second GUI the selected subset of work-flow data in a second interactive document on the second client.

In another exemplary embodiment, the present invention can be a method in a computer system for paperless business work-flow review and management including the steps of: creating an interactive document electronically; entering the interactive document into a document entry stage; electronically submitting the interactive document to a first approval level from the document entry stage, when document approval is required by a set of business rules; approving the submitted interactive document; for N levels of approval, iteratively submitting the interactive document electronically to the next approval level, up to level N, when the interactive document is approved at the previous approval level, where N is an integer greater than zero; returning the interactive document to the document entry stage when the interactive document is rejected at any of the first through N approval levels; electronically processing the interactive document at the processing level when the interactive document is approved at all required approval levels; verifying the electronic processing of the interactive document; and archiving the interactive document.

In another exemplary embodiment, the present invention can be a method in a computer system for paperless business work-flow review and management having N required approval levels where N is greater than or equal to zero, the method including the steps of: creating an interactive document electronically by an originator; entering the interactive document into a document entry stage; electronically submitting the interactive document to a first required approval level from the document entry stage, when document approval is required by a set of business rules; receiving approver disposition from at least one first level approver, wherein the disposition is one of approve, unapprove, and reject; checking for approval by all required approvers of the first required approval level; submitting the interactive document for approval to a next approval level after all required approvers of the first required approval level have approved of the interactive document; repeating the steps of electronically submitting through checking for approval for each of N approval levels.

In another exemplary embodiment, the present invention can be an apparatus for paperless business work-flow review and management including: means for creating an interactive document electronically; means for entering the interactive document into a document entry stage; means for electronically submitting the interactive document to a first approval level from the document entry stage; means for approving the submitted interactive document; for N levels of approval, means for iteratively submitting the interactive document electronically to the next approval level, up to level N, when the interactive document is approved at the approval level, where N is an integer greater than zero; means for returning the interactive document to the interactive document entry stage when the interactive document is rejected at any of the first through N approval levels; means for electronically processing the interactive document at the processing level when the interactive document is approved at all approval levels; means for verifying the electronic processing of the interactive document; and means for archiving the interactive document.

In another exemplary embodiment, the present invention can be an apparatus for paperless business work-flow review and management having N required approval levels where N is greater than zero, the apparatus including: means for creating an interactive document electronically by an originator; means for entering the interactive document into a document entry stage; means for electronically submitting the interactive document to a first approval level from the document entry stage when document approval is required by a set of business rules; means for receiving an approver disposition from at least one first level approver, where the disposition is one of approve, unapprove, and reject; means for checking for approval by all required approvers of the first approval level; and means for submitting the interactive document for approval to the next approval level after all required approvers of the first approval level have approved of the interactive document.

In another exemplary embodiment, the present invention can be a computer program product embodied on a computer usable medium comprising program logic to be executed on a computer, the program logic including: means for creating an interactive document electronically; means for entering the interactive document into a document entry stage; means for electronically submitting the interactive document to a first approval level from the document entry stage when document approval is required by a set of business rules; means for approving the submitted interactive document; for N levels of approval, means for iteratively submitting the interactive document electronically to a next approval level up to level N when the interactive document is approved at a previous approval level, wherein N is an integer greater than or equal to zero; and means for returning the interactive document to the interactive document entry stage when the interactive document is rejected at any of the first through N approval levels.

In another exemplary embodiment, the present invention can be a computer program product embodied on a computer usable medium comprising program logic to be executed on a computer, the program logic including: means for creating an interactive document electronically by an originator; means for entering the interactive document into a document entry stage; means for electronically submitting the interactive document to a first approval level from the document entry stage when document approval is required by a set of business rules; means for receiving approver disposition from at least one first level approver, wherein the disposition is one of approve, unapprove, and reject; means for checking for approval by all required approvers of the first approval level; and means for submitting the interactive document for approval to a next approval level after all required approvers of the first approval level have approved of the interactive document.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of a preferred embodiment of the invention, as illustrated in the accompanying drawings wherein like reference numbers generally indicate identical, functionally similar, and/or structurally similar elements. The left most digits in the corresponding reference number indicate the drawing in which an element first appears.

DETAILED DESCRIPTION OF AN EXEMPLARY EMBODIMENT OF THE PRESENT INVENTION

A preferred embodiment of the invention is discussed in detail below. While specific exemplary embodiments are discussed, it should be understood that this is done for illustration purposes only. A person skilled in the relevant art will recognize that other components and configurations can be used without parting from the spirit and scope of the invention.

Figure 1:
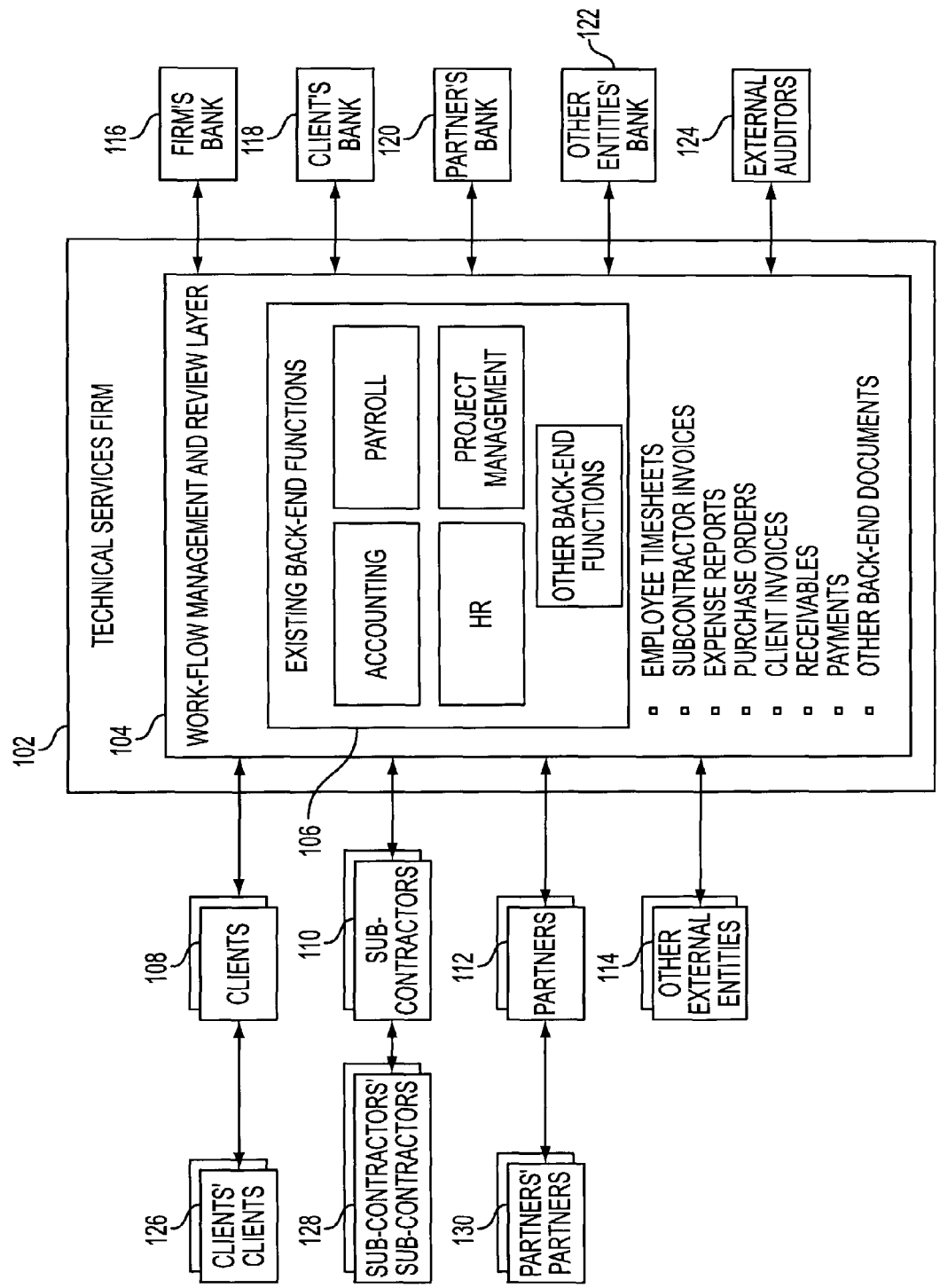
FIG. 1 depicts an exemplary embodiment of the present invention.

FIG. 1 depicts an exemplary embodiment of the present invention. Most services companies 102 have departments known as the 'back-end' or 'back-office'. These departments typically include an accounting department, payroll, and human resources. Additionally, a project management department can function as a back-end area of the company because it is not seen by outside viewers such as clients.

These departments must all interact with each other and also with clients 108, sub-contractors 110, business partners 112 and other external entities 114. A services company also must interact with external agencies such as banks 116-122 to coordinate billing, receiving and employee payroll, and other back-end functions, and auditors 124 to ensure compliance. An exemplary embodiment of the present invention acts as a workflow management and review layer 104 between the internal back-end departments 106 and the external entities. By interacting with all of the back-end departments, the present invention can coordinate the production and flow of documents, for example, employee timesheets, subcontractor invoices, expense reports, purchase orders, client invoices, receivables and payments. The present invention provides a unified and fully customizable interface to all entities in the labor hour supply chain. In an exemplary embodiment, the interaction between the present invention and the back-end departments is implemented using extensible markup language (XML).

In an exemplary embodiment, the present invention acts as a "wrapper" around existing financial and human resources systems which implements and enforces a set of configurable "business rules" and "best practices". A "business rule" in the context of the present invention is an enforced description of how, and by whom, key business data may be created, viewed, processed, and altered. A "best practice" is the implementation of a set of business rules that result in a business related action performed in the most efficient and error-free way. Examples of business rules and best practices are discussed below.

Figure 2:
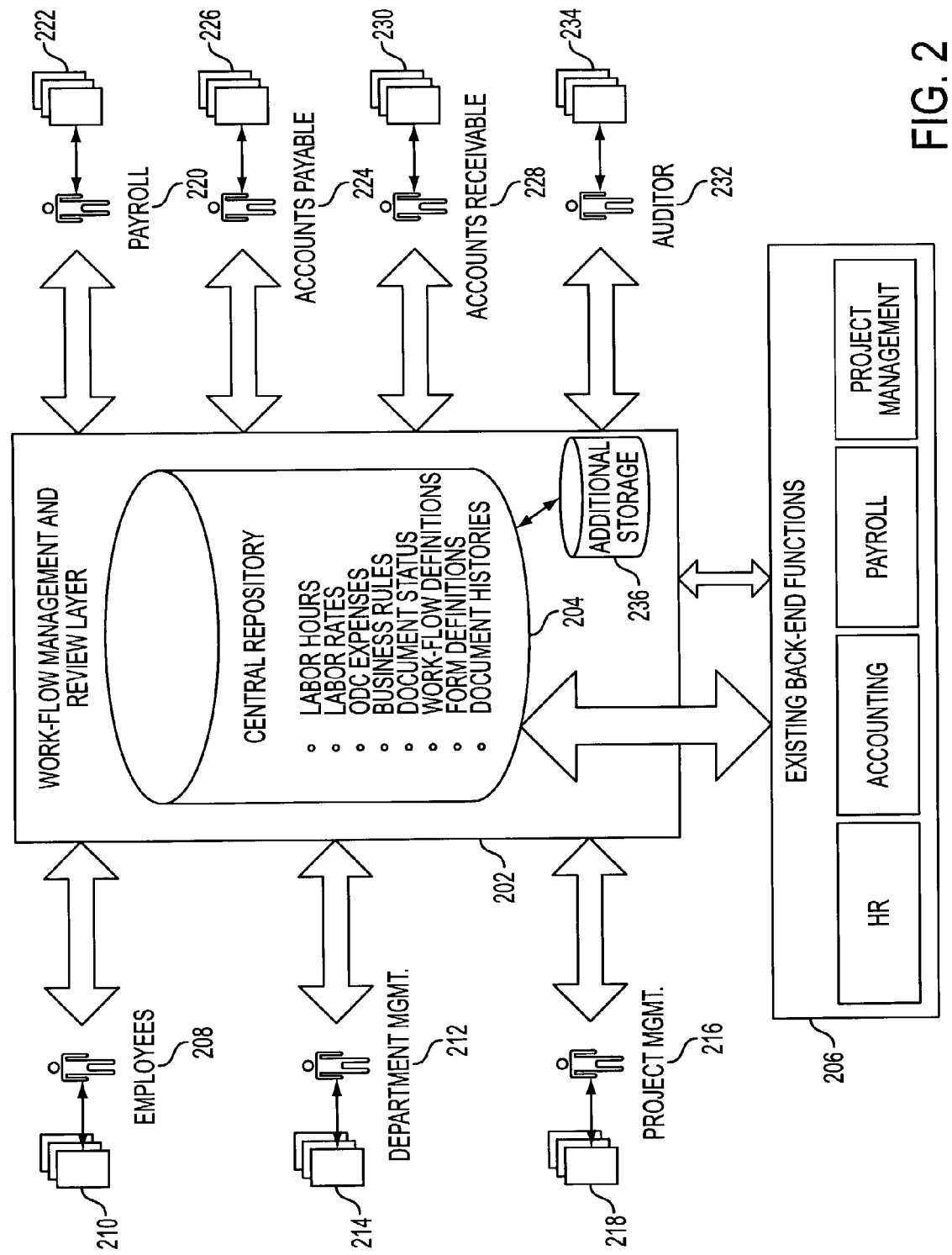
FIG. 2 depicts another aspect of an exemplary embodiment of the present invention.

FIG. 2 depicts an exemplary embodiment of the present invention. From one central repository 204 of key business data, including time-charging data such as labor hours and labor rates, the work-flow management and review layer 202 embodiment of the present invention can provide the same data to any person in any role in the format needed.

For example, an employee 208 can access and create documents 210 such as individual timesheets, individual expense reports and individual personnel actions. The employee 208 would only see the data that he was allowed to see, according to the business rules. Further, the employee 208 would see the documents related to that data in the format defined by the employee's organization. A department manager 212 can access departmental data from the same repository to view and create documents 214 such as, for example, department reports, department expense reports, department timesheets and department personnel actions. Again, the department manager 212 would only see the data relevant to his role. A project manager 216 can view and create documents 218 of project-specific reports and data, such as project expense reports, timesheets, personnel actions and contract actions.

Accessing the data in the repository does not need to involve other departments, such as accounting, and can happen in real-time and in parallel. In addition, business rules can be set up to limit access to the data depending on a user's role. Employees 208, for example, would not have access to the time records of other employees, while managers 212 would. Each user's view of the data can also be customized to their organization. For example, two managers, in two different companies, looking at the same charge or account data would see the charge or account numbers that their company used, regardless of the origin of the data. Further, each manager would see the data in the format used by their own company, including document layout, logos, fonts and color schemes.

Additional uses of the data from the repository can include a payroll employee 220 using project timesheets and project personnel actions 222 to generate paychecks for employees. An accounts payable employee 224 can match up labor backup data with sub-contractor invoices, and expense backup data with expense reports to arrange payments. Accounts receivable 228 can use project timesheets to generate invoices to clients and provide back-up data for the invoices, such as timesheets showing only the relevant time charges. Auditors 232 can view timesheets, expense reports and audit logs to verify proper time-charging. The existing back-end departments 206 can also access the data for their functions.

Figure 3:
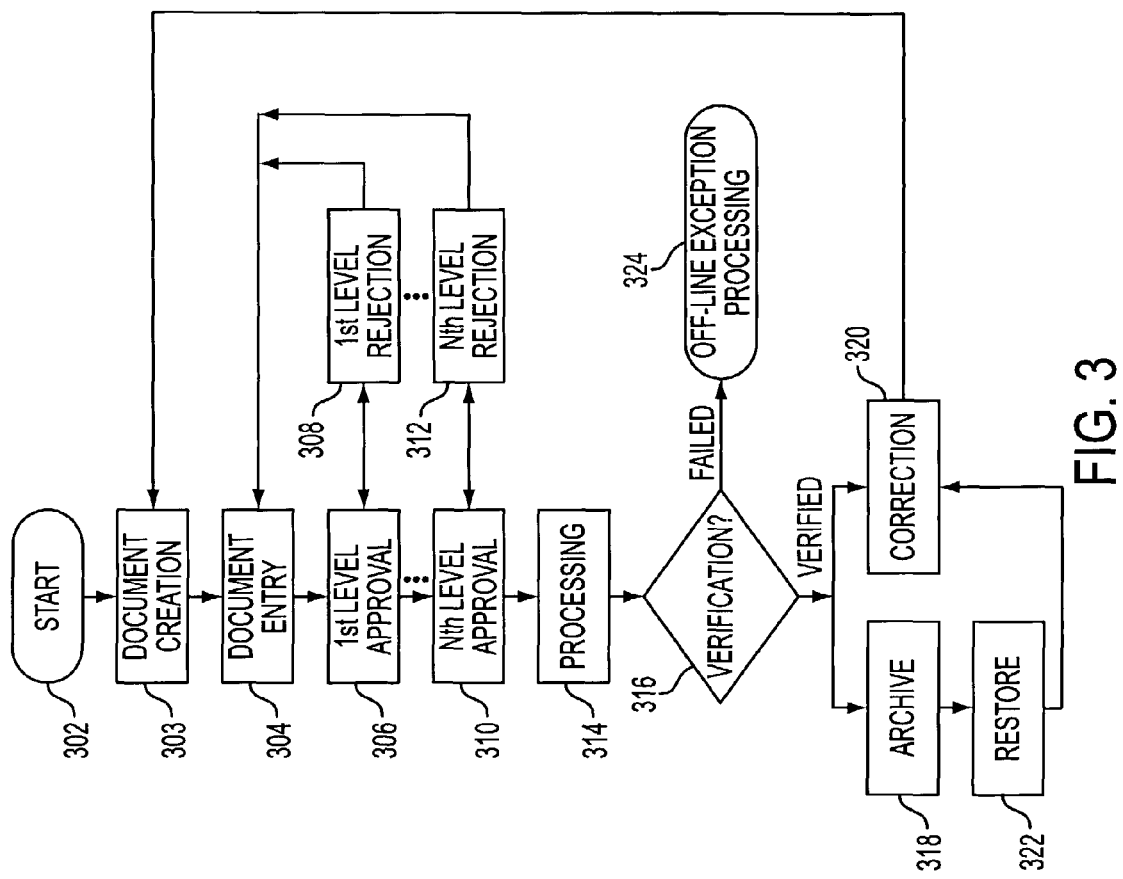
FIG. 3 depicts an exemplary embodiment of a document work flow according to the present invention.

FIG. 3 depicts an exemplary embodiment of a document work flow according to the present invention. At the beginning of the flow 302, an employee of a service industry company creates a new document in step 303. The employee then interacts with the document in document entry 304. Such interactions can include editing a document, saving a document, submitting or un-submitting a document. When the user of the document is finished interacting with the document, the document can proceed through one or more levels of approval, based on the business practice of the company. If, for example, the document is a time sheet, the first level approval 306 typically requires one or more project managers' approvals. Within each approval level, if multiple approvals are required, the document can be viewed and approved in parallel by the approvers. Further, each approver only sees the data corresponding to the projects for which he is responsible, as defined in the business rules. If the employee has worked on projects for a different approver, the first approver will not see those second project charges. If the document is rejected by an approver at the first level, in block 308, the document returns to the document entry stage 304 where it can be modified by the submitter. If the document is approved by all of the required approvers at the first level 306, it can then travel through zero to N more levels of approval. For example, a functional manager may need to approve a timesheet after the program managers have approved it. Nth level approval 310 can proceed in the same way as the first level of approval 306. An example of Nth level approval is a process organization approval. If, at any level, the document is rejected, as in block 312, the document returns to the document entry stage 304.

At every point in the approval process, regardless of which organization is viewing the document and the data, the view of the document and data will conform to that organization's internal format. For example, a manager at Company A approving a timesheet for an employee of Company B will see Company A's accounting codes, logo, pay-period, timesheet layout, etc. A manager at Company B, perhaps a sub-contractor to Company A, can look at the same information in Company B's format, including Company B's internal accounting codes, pay-period, logo and timesheet layout.

Once approved at all required levels, the document is processed in block 314. Processing events can include cutting paychecks, generating invoices, receiving payments, etc.

After processing, the document is verified in block 316. During verification, the back-end system is updated accurately with the document's information. Then the information is read back from the back-end system to ensure proper data entry. If verification fails, usually due to a synchronization problem between two systems, the failure is handled in an off-line exception processing procedure 324. When verification succeeds, the document can be archived in block 318. Archiving a document removes it from the back-end system and stores the document remotely. Archiving saves storage space on the back-end system.

At any point after verification, if a document needs to be corrected and the document has not yet been archived, it can be corrected in block 320. When a document is corrected, a new document, with its own unique identifier, is created in block 303 as a copy of the original document. The document owner can then send the new correction document through the same approval paths as the original document. The original document is preserved.

If the document has already been archived, it must first be restored to the backend system from the archive in block 322 before the document can proceed to correction in block 320. If no correction is needed, the document cycle ends at 318, where the document will remain archived indefinitely.

In an exemplary embodiment of the present invention, the service industry's best practices can be fully integrated into the method of the present invention without requiring any customization from the user. For example, the system and method of the present invention can be configured "out of the box" to pay salaried staff automatically, even if no time reports are received. Another best practice is to allow project managers to approve submitted expenses in parallel rather than in sequence. Further examples include obtaining customer approval of charges prior to billing the customer, which reduces billing disputes and wasted time; automatically notifying the responsible manager when a specified expenditure level has been reached, to prevent cost overruns; and limiting access to time expense information according to various criteria, such as role, organization or project. The method and occurrence of automatic notification is defined in the business rules, and can be implemented, for example, by electronic mail, a pager message and by telephone. Any of these best practices can be incorporated into the document flow illustrated in FIG. 3.

The present invention improves on conventional practices by significantly speeding up the start-to-finish processing of documents. Under conventional systems, paper documents must be physically moved from person to person, whether by mail, fax or hand-carrying. The time wasted waiting for documents to be moved, as well as the expense involved in moving them, is costly to the organizations that use the documents. The present invention eliminates the costs of physically moving documents by making them accessible electronically from anywhere that has access to the data. Additionally, the present invention saves time by allowing a document to be re-submitted into the work flow at the same point where the document left the work-flow, provided that the originator has not made any changes. The document does not have to start at the beginning of the work flow, which saves time.

Figure 4:
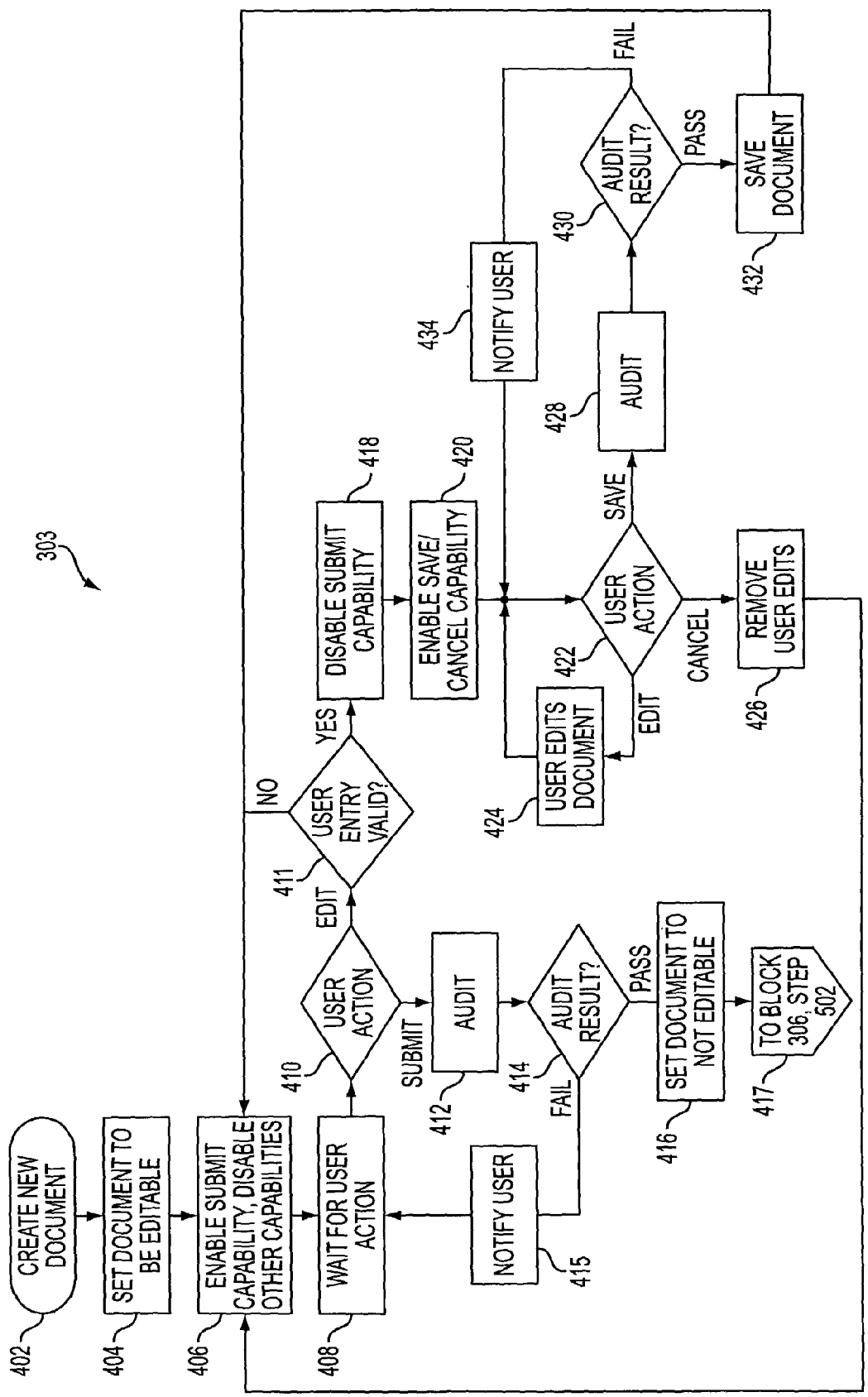
FIG. 4 depicts an exemplary embodiment of the process of new document creation according to the present invention.

FIG. 4 depicts an exemplary embodiment of the process of new document creation 303, according to the present invention. At the beginning, a user creates a new document in the system, in block 402. For example, a new document can be a time sheet, an invoice, an expense report, a purchase order or other financial reports. The system then makes the document editable in block 404. In block 406, the system next enables a submit capability for the document, and disables capabilities that are not applicable to the document at this stage, such as, for example, save and cancel. Then the system waits for user action in block 408.

If the user action in block 410 is a submission of the document, the document is audited by the system in block 412. An audit process can check that time entries are valid, or that valid charge numbers were used, or various other checks to make sure that the entries in the document are correct. If the document fails the audit in block 414, the system notifies the user of the failure in block 415 and returns to waiting for user action at block 408. A document that fails an audit must be modified by the user and rechecked before the document can proceed to the next stage of the work flow. If the document passes the audit, the document is set to not be editable in block 416, and is submitted in block 417 to the next stage of the work flow, block 502 in FIG. 5.

If the user action at 410 is to edit the document, the system first checks that the user's entry is valid in block 411. If the entry is not valid, for example, when a user enters a letter into a numeric data field, the invalid entry is cleared and the system returns to block 406. If the entry is valid, the system disables the submit capability in block 418, and enables other features appropriate to the state of the document, such as save and cancel, in block 420. Once the user has chosen to edit the document, and the appropriate features are enabled, the user can continue editing the document, save the document, or cancel the edits in block 422. If the user makes an invalid modification to the document, the invalid entry is cleared and the system returns to block 422. The validity of an entry is determined by the defined business rules. As long as the user continues to edit the document in block 424, the system waits for user action in block 422. If the user cancels, the system removes all of the user's edits from the document in block 426, and returns to block 406.

If the user saves the document, the document is audited in block 428. An audit is driven by the established business rules. Auditing a saved document can verify, for example, that needed fields are filled in, and that the field values for the fields that are filled are correct. The audit will not necessarily fail, however, if some of the fields are left blank, because the user can come back to the document later to complete it. If the document passes the audit at block 430, the document will be saved to the system in block 432. The system then returns to block 406, allowing the user to submit the document. If the audit fails, the user is notified of the failure at block 434, and the system again awaits user action at block 422.

At any point of user action, such as at blocks 410 and 422, the user may also choose to close the document and exit the system (not shown). Document closure can also include canceling or saving changes prior to closure. A closed document can be reopened later for further work.

Figure 5:
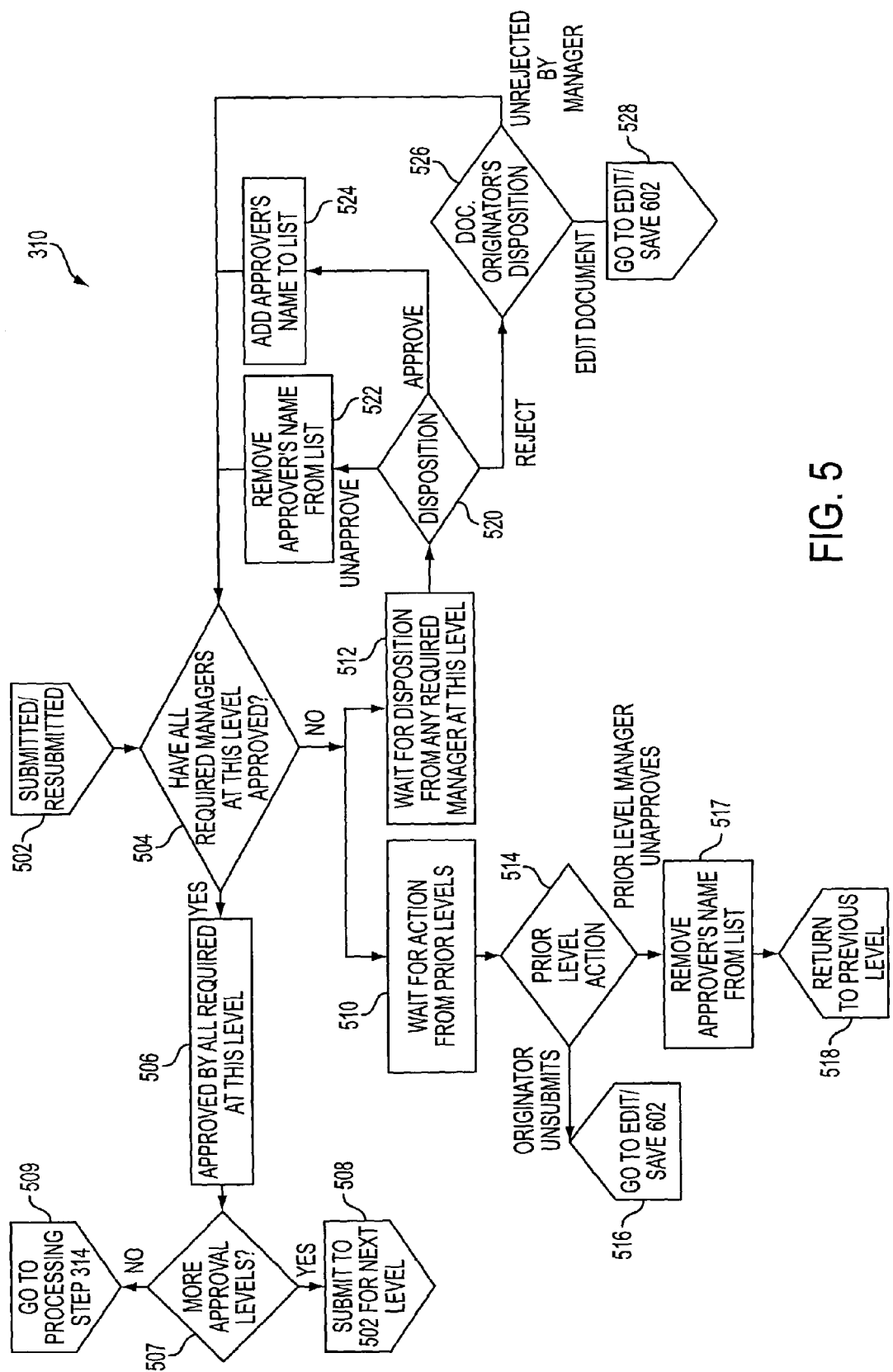
FIG. 5 depicts an exemplary embodiment of the document approval process according to the present invention.

FIG. 5 depicts an exemplary embodiment of the document approval process 310 according to the present invention. As was described with respect to FIG. 3, document approval can take place through any number of successive layers. The process illustrated in FIG. 5 can take place at any of those layers. At the beginning, in block 502, a document is submitted from a process "higher up" in the work flow in FIG. 3, such as from block 304 or 306. At the approval layer represented in FIG. 5, there can be zero, one or more managers whose approval is needed for the document. The exact number required is defined by the business rules of the organization. When the document is submitted, the system checks, in block 504, whether all of the required approvals for this level have been acquired. If there are no manager approvals needed at this level, then the answer is automatically "yes" and the document proceeds to the state of being approved by all managers required at this level in block 506. If there are more levels of approval needed at block 507, the document can then proceed to the next approval level in block 508. If no more approvals are needed, the document can proceed to the processing step 314 in block 509. Similarly, when all of the required managers at this level have approved, the document can move to the next level of approval.

When multiple approvals are needed, the approval process can proceed in parallel. If not all of the required approvals have been acquired, the system awaits an action or disposition on the document, both from the managers at the current level in block 512, and by people from prior levels of approval in block 510. When a manager reviews the document, he only sees the data that correspond to projects for which he is responsible. When a required manager at this level acts on the document, at disposition block 520, the manager can make three different decisions. First, the manager can approve the document, which adds the manager's name to a list of required approvals for the document in block 524. Then the system returns to decision block 504 to determine if all of the approvals have been acquired. Second, if the manager has previously approved the document in disposition block 520, the manager can then unapprove the document, which removes the manager's name from the list of required approvals for the document in block 522. The system will then check the current state of the approvals for the document back in decision block 504.

Third, the manager can reject the document in disposition block 520. Rejecting a document returns the document to the originator of the document. The document originator must then act on the document in block 526. Before or while the originator examines the document, the manager can unreject the document, which returns the document to the system at block 504. An unreject is not automatically an approval. The manager may unreject but decide to come back to the document later to examine it for approval. The user at block 526 may also decide to edit or re-submit the document. This sends the document, in block 528, to the edit/save portion of the document entry block 304, which is discussed further below. When the document is sent to edit/save, it is removed from this level in the process.

The process illustrated in blocks 504, 512, 520, 522-526 can occur in parallel when there is more than one manager required at the current level. One manager does not need to wait for another manager at the same level to approve before he can examine and approve the document. Parallel document approval can greatly enhance the efficiency of the document work flow. While each level of approval 306 or 310 is serial, within each level the approval can proceed in parallel.

During the document approval process, the system also waits for actions from people from the prior levels in block 510. People from the prior levels can include the originator of the document, and managers from a previous level. If such an action occurs in block 514, there can be two possible outcomes. The originator may unsubmit the document, which will remove the document from this level and return it, in block 516, to the edit/save portion of the document entry block 304. Alternatively, a manager from a previous level may unapprove the document. The approver's name is removed from the list of approver's in block 517. Then the document is removed from this level and returned to block 504 of the previous level.

Once all required approvals have been obtained, the document can proceed to step 502 of the next approval level, at block 508. If the current level is the final manager approval layer, the document will proceed to processing block 314 (not illustrated). Processing can include payroll, accounting, human resources and billing-related processing.

Figure 6:
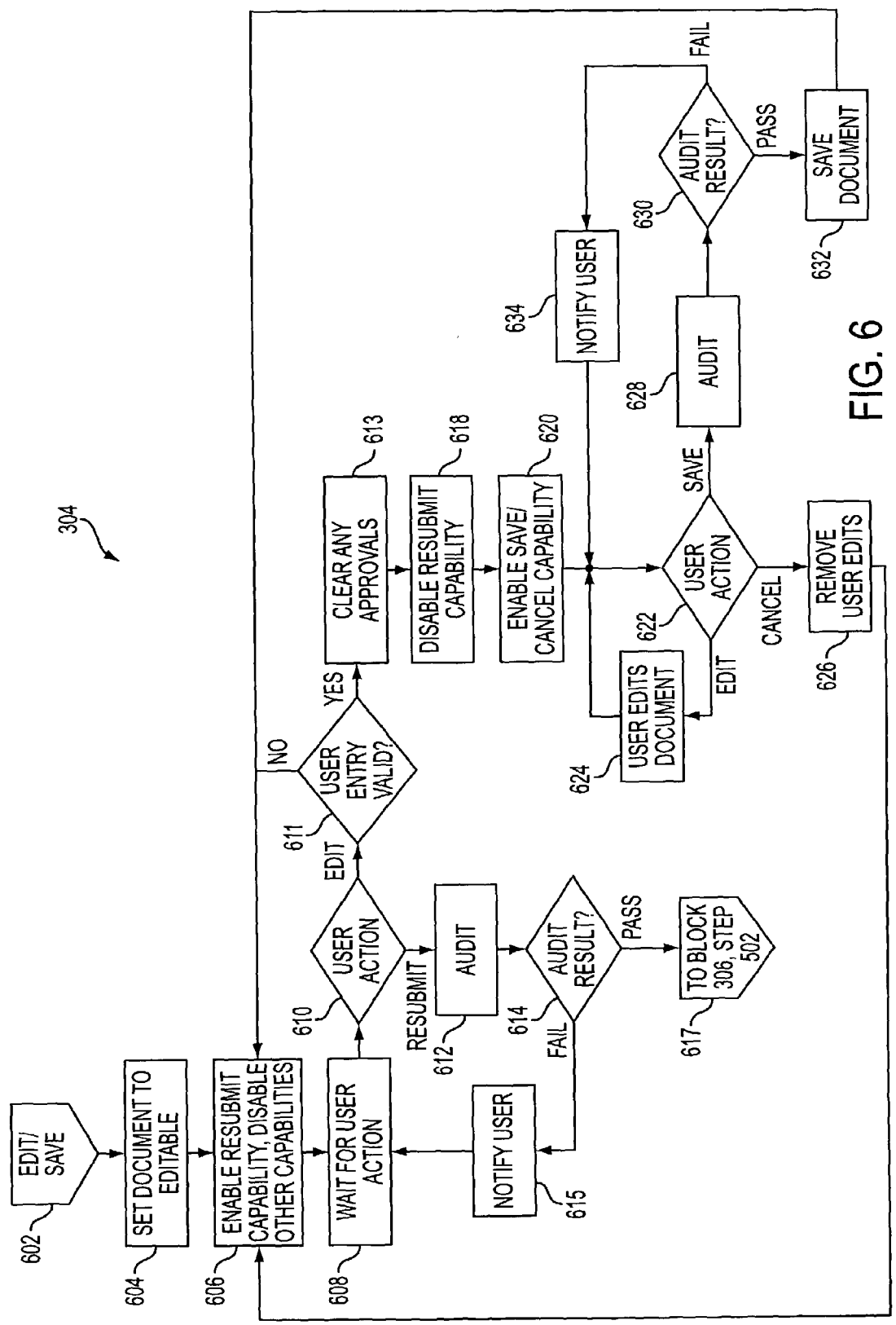
FIG. 6 depicts an exemplary embodiment of the document editing process according to the present invention.

FIG. 6 depicts an exemplary embodiment of the document editing, or edit/save, process 304, according to the present invention. In the description of the process, it is assumed that the person editing the document has editing privileges for the document. Usually, only the originator of the document has such privileges. The system does check whether a person has editing privileges before allowing that person to edit or even see the document.

When a document enters the edit/save process from another point in the document work flow, in block 602, the system sets the document to be editable in block 604. Then the system proceeds in a manner very similar to the process illustrated in FIG. 4. In block 606, the system enables appropriate features, such as re-submit, and disables inappropriate features, such as save and cancel. If the user edits the document, any previously obtained approvals for the document are cleared from the document in block 613, because once changed, the document has to start the approval process from the beginning. When the user resubmits the document after making any required changes, the document begins the approval process of block 306 again, in step 616.

Figure 7:
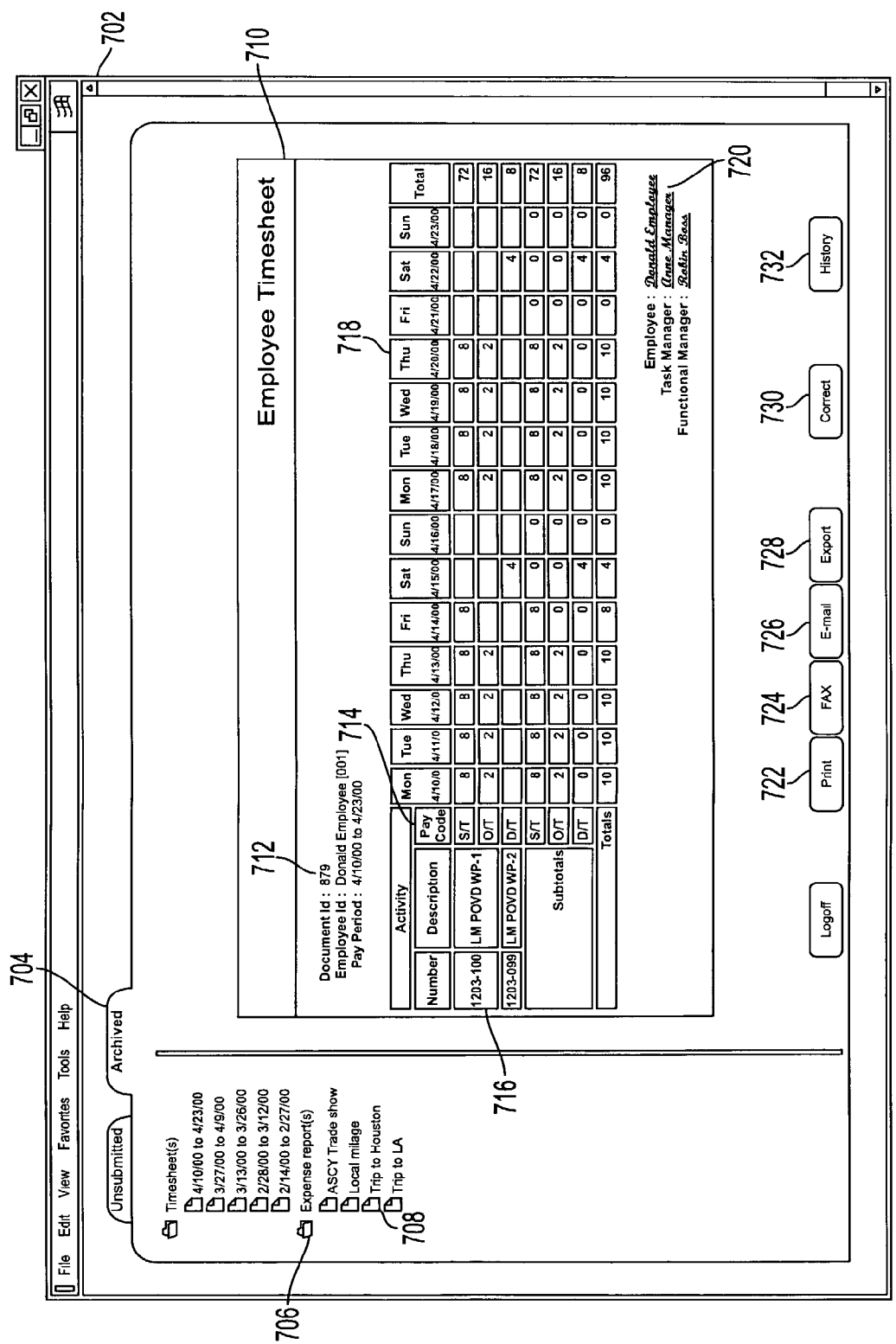
FIG. 7 depicts an exemplary embodiment of a timesheet graphical user interface (GUI) according to the present invention.

FIG. 7 depicts an exemplary embodiment of data collection and display via a timesheet graphical user interface (GUI) according to the present invention. In a preferred embodiment of the present invention, the GUI is accessed through an Internet browser 702 and is World Wide Web-based. This means that no software installation at the user site is needed and that the present invention is hardware platform independent. In one embodiment, the documents available to a user in a role (such as employee, manager, accounting, etc.) can be displayed according to their state 704. States can include, for example, submitted, unsubmitted, and archived. Within each state grouping, documents can be arranged in a well-known folder 706 and documents 708 hierarchy. The GUI can be customized to present only the information and documents that make sense for the specific user.

The document 710 itself can be displayed in the browser window 702. For example, a timesheet, in an exemplary embodiment, can have a unique ID 712 that allows tracking of the document throughout its life. The document can also be customized to resemble the organization's traditional paper documents, including corporate logo, specialized fields and layout. For example, the timesheet in FIG. 7 has rows 716 for separate account codes and a column 714 for pay codes, indicating standard time, overtime and double-time.

The employee can record or change the time charged per client for each day of the time-charging cycle in the modification fields 734. The timesheet can automatically calculate sub-totals and totals for the day 736, week 738, and contract number 740. The days 718 in the pay period can be arranged according to the organization's calendar or time-charging cycle. As the document travels through layers of approval, electronic signatures 720 are attached. Buttons at the bottom of the screen can allow the viewer of the document to print 722, fax 724, or e-mail 726 the document to others. Document data can also be exported with button 728 for use in other programs. If correction is needed, and the document has already been processed, the employee can use the correct button 730 to create a new timesheet for corrections. Finally, the history of the document can be viewed with button 732, including who has edited the document, who has seen it and at what stage it is in the process. The accessibility of any of these features can be modified through the business rules.

Figure 8:
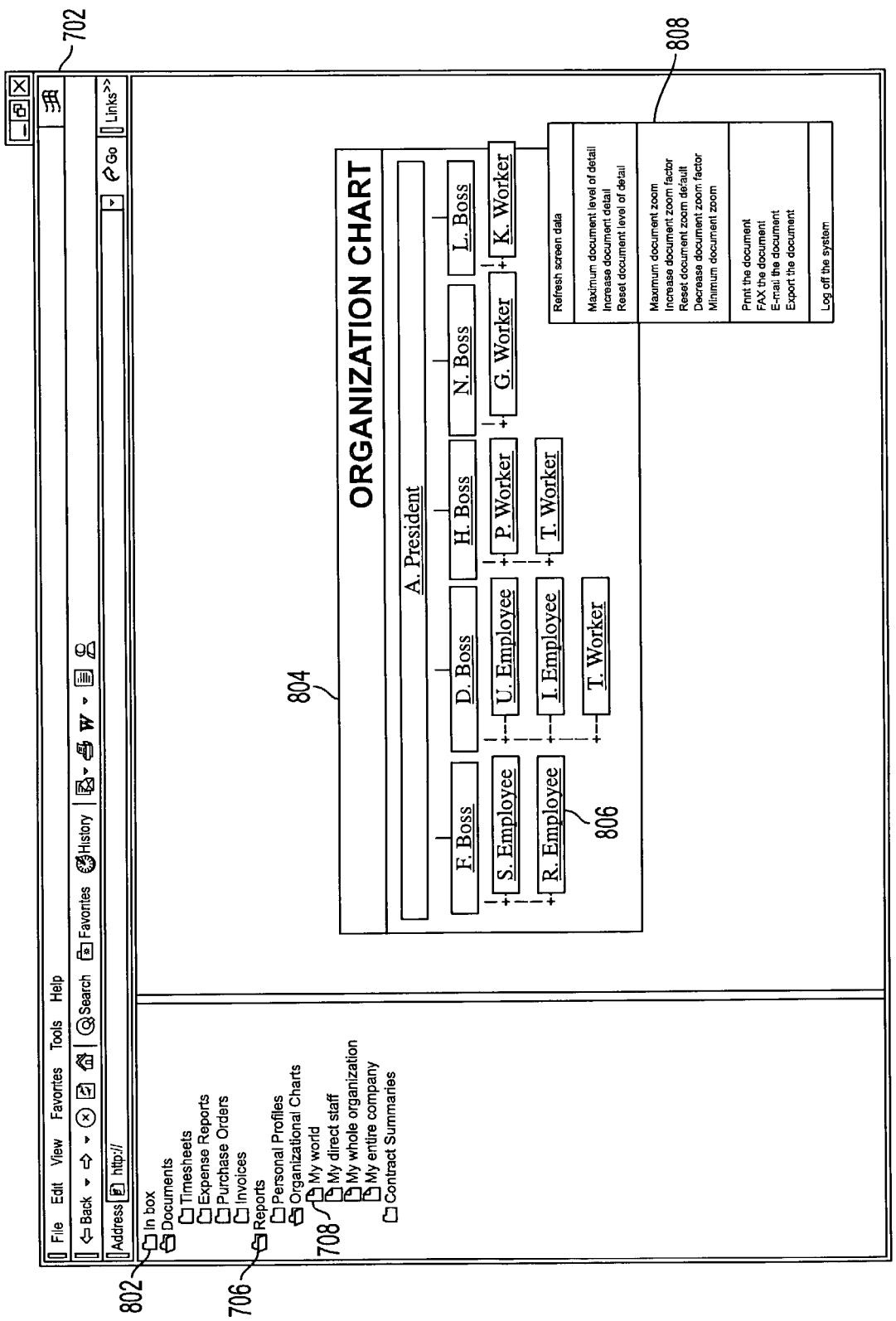
FIG. 8 depicts an exemplary embodiment of an organization chart GUI according to the present invention.

FIG. 8 depicts another exemplary embodiment of a GUI according to the present invention, showing an organization chart. The GUI is displayed through a Web browser 702. On the left of the GUI can be an in-box folder 802, which can contain documents which require attention from the user. Documents 708 can be organized according to type, as well as by state.

The organization chart 804 can be fully integrated with the business rules and business process of the present invention. Each name 806 in the organization chart can be used to send an e-mail directly to the individual. In addition, when the appropriate business rules are set up, a document submitted from someone at the bottom of the chart can be automatically submitted to the person higher up from the submitter. The GUI can also have a floating menu 808 providing access to common document related functions, such as, e.g. zooming in and out of the data view, printing, faxing, or emailing the document, changing the document's level of detail, or exiting the system.

In an exemplary embodiment of the present invention, any desired key paper-based business process can be automated. Additionally, the initial set up of the present invention can provide current industry best practices without the new user having to configure the system. Alternatively, in the automation, a user can recreate, in electronic format, the forms and documents on which their own company's or industry's processes are based. Then the user and organization can define how the forms together with their data flow through the organization and are acted upon until the forms reach their final repository. That repository can be any storage solution, such as an existing back-end accounting system, a client's accounting system, a database or some combination. The definitions associated with the forms are the business rules.

In an exemplary embodiment of the present invention, the web-based GUI can be implemented using extensible markup language (XML).

Figure 9:
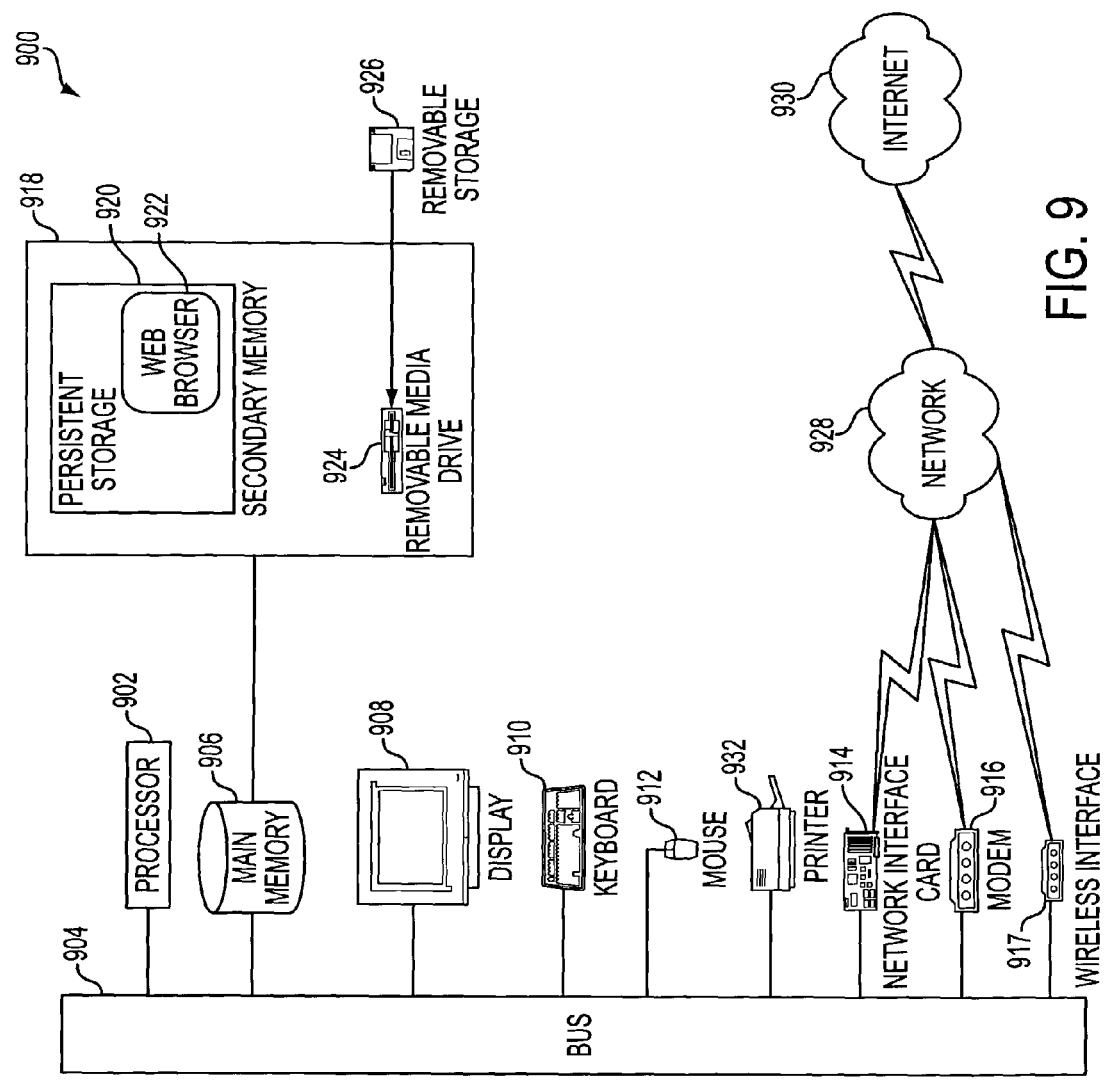
FIG. 9 depicts an exemplary computer system according to the present invention.

FIG. 9 shows an exemplary embodiment of a computer system 900 in the system of the present invention. A preferred embodiment is a computer that can include, e.g., a personal computer (PC) system running an operating system such as, e.g., Windows NT/98/2000/CE/XP, OS/2, LINUX, or other variants of the UNIX operating system. However, the invention is not limited to these platforms. Instead, the invention can be implemented on any appropriate computer system running any appropriate operating system, such as Solaris, Irix, Linux, HPUX, OSF, Windows 98, Windows NT, OS/2, Mac/OS, and any others.

The computer 900 includes one or more processors, such as processor 902. The processor 902 is connected to a communication bus 904. The computer 900 can also include a main memory 906, preferably random access memory (RAM), and a secondary memory 918. The secondary memory 918 can include, e.g., persistent storage 920, or storage area network (SAN) and/or a removable media drive 924, representing a floppy diskette drive, a magnetic tape drive, a compact disk drive, etc. The removable media drive 924 reads from and/or writes to a removable storage medium 926 in a well known manner.

Removable media drive 924, also called a program storage device or a computer program product, represents a floppy disk, magnetic tape, compact disk, etc. The removable media drive 924 includes a computer usable storage medium having stored therein computer software and/or data, such as an object's methods and data.

The computer 900 also includes an input device such as (but not limited to) a mouse 912 or other pointing device such as a digitizer, and a keyboard 910 or other data entry device.

The computer 900 can also include output devices, such as, e.g., display 908 and/or a printer 932. The computer 900 can include input/output (I/O) devices such as, e.g., network interface cards 914, modem 916 and wireless interface 917. The I/O devices can be connected to an internal network 928 and then to an external network 930, such as the Internet. The I/O devices may also connect directly to the external network 930.

Computer programs (also called computer control logic) are stored in main memory 906 and/or the secondary memory 918 and/or removable storage units 926, also called computer program products. For example, one embodiment of the present invention uses a web browser 922 to view and access time charge data, which can be stored on the same computer, or on a different computer or a server on a network, accessible to the client computer. Such computer programs, when executed, enable computer 900 to perform the features of the present invention as discussed herein. In particular, the computer programs, such as web browser 922, when executed, enable the processor 902 to perform the features of the present invention. Accordingly, such computer programs represent controllers of the computer system 900.

In another embodiment, the invention is directed to a computer program product comprising a computer readable medium having control logic (computer software) stored therein. The control logic, when executed by the processor 902, causes the processor 902 to perform the functions of the invention as described herein.

Figure 10:
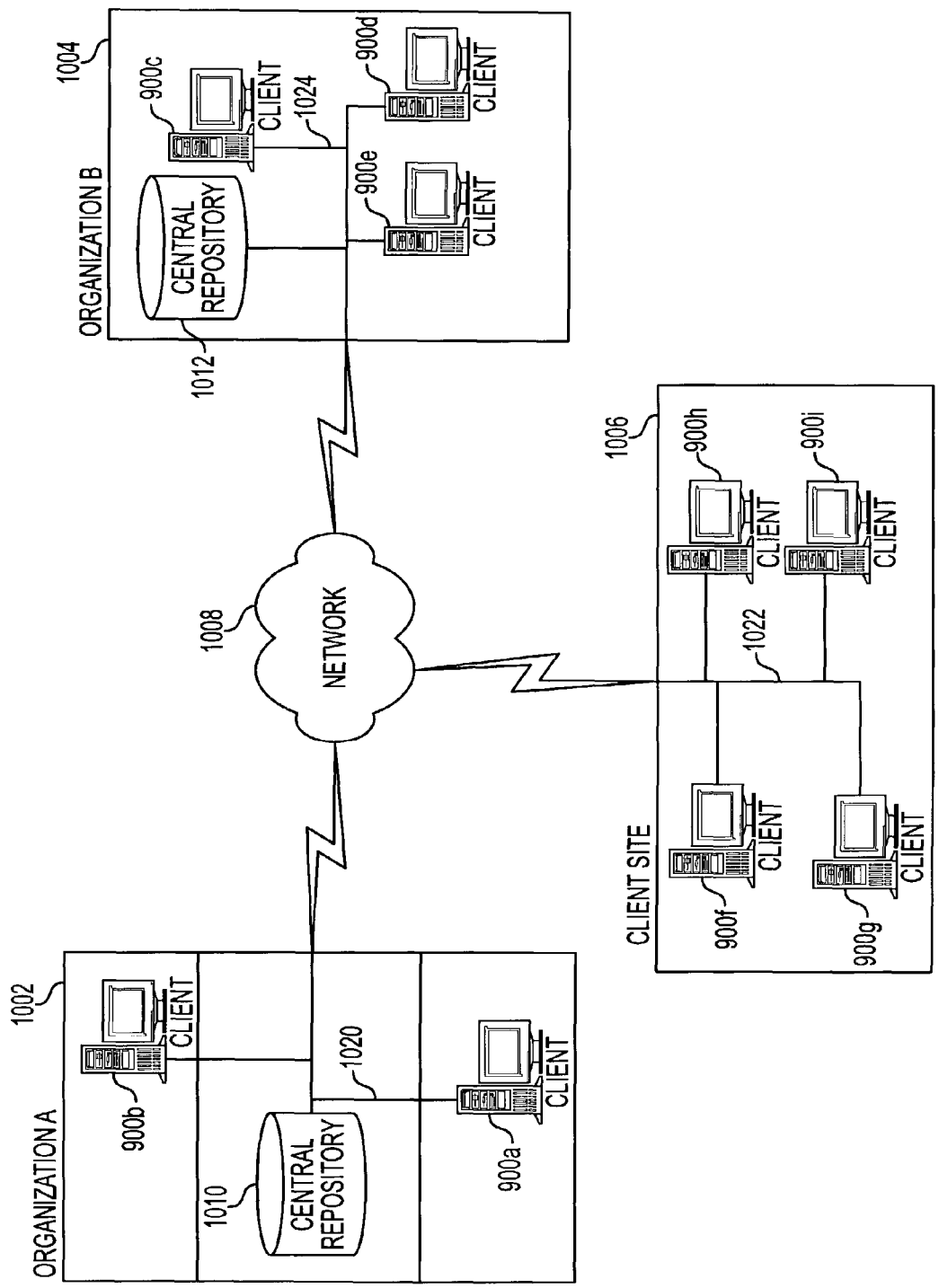
FIG. 10 depicts an exemplary contractor/client system according to the present invention.

FIG. 10 depicts an exemplary embodiment of the system of the present invention. Organization A 1002, organization B 1004 and client site 1006 can all be interconnected through a network 1008, such as, e.g. the Internet, or a secure private network. Organization A may be a service providing company with a central data repository 1010 for storing and retrieving key business data. Organization A may have multiple client computers 600 connected to the central repository 1010 through an internal network 1020. For example, client 900*a* may be an employee's computer and client 900*b* may be a manager's computer, or an accounts receivable computer. Organization B may be a subcontractor company, hired by organization A for work on a particular contract. Organization B may also have its own central repository 1012 for storing and retrieving its own key business data, and client computers 900*c-e*. The client computers and the central repository may be connected to each other through a second internal network 1024. Client site 1006 may be a client company that contracted with company 1002. Client site 1006 may not have its own central repository, but it does have one or more client computers 900*f-i* connected through an internal network 1022 with a connection to the external network 1008.

Organization A can create and set up business rules that allow organization B to submit their hours worked directly to central repository 1010 via network 1008. Other business rules could be set up that specify the way in which time is charged. Some examples of time charging business rules include defining the resolution of hours that can be charged, such as in fractions of hours; the duration of the time reporting period (e.g. the number of days, calendar months, etc.); and the start and end dates of a time reporting period (e.g. Monday, 1st and 15th of the month, second Tuesday).

Business rules regarding the functionality attached to the document can be set up. Some examples include defining who can view the document; who can fax, e-mail and/or export a document; and what the minimum, maximum, and default document zoom factors are for the document.

Business rules can be created around account behavior. Some examples include whether an account is billable; who can bill to the account and whether the account can take travel, labor and/or material charges. There can be many different business rules that can govern document creation, behavior, format and the processes of which a document is part. The company that uses the present invention can define their own business rules to specify how information is used and shared within their organization and by external parties such as sub-contractors and customers.

Additional features of the present invention can include electronic signatures in accordance with government standards for electronic signatures. The use of electronic signatures eliminates the need to print out documents for signatures. Electronic signatures can also be used for user actions, such as submitting and approving a document. There can be enhanced electronic interfaces to service providers, corporate credit card service providers and external payroll service providers. Integration with existing e-mail programs can assist in document delivery and notifications.

Further still, an exemplary embodiment of the present invention can include support for mobile telephone, personal digital assistants (PDAs) and wireless Internet devices, and for mobile users.

While various embodiments of the present invention have been described above, it should be understood that they have been presented by way of example only, and not limitation.

What is claimed is:

1. A method in a computer system for paperless business work-flow review and management comprising:
   a) receiving at a first computer an interactive electronic document from an originator computer;
   b) modifying a state associated with said interactive electronic document by said first computer to indicate a waiting for approval state, wherein said waiting for approval state prohibits editing of said interactive electronic document;
   c) concurrently transmitting to a plurality of workflow computers said interactive electronic document from said first computer;
   d) concurrently receiving at said first computer first sets of data from said plurality of workflow computers, wherein said first sets of data indicates an approval of said interactive electronic document; updating an approval list of said interactive electronic document by said first computer based on said first sets of data, wherein said approval list comprises a list of all received approvals of said interactive electronic document;
   e) receiving at said first computer a second set of data from a first one of said plurality of workflow computers, wherein said second set of data indicates a rejection of said interactive electronic document; modifying said state associated with said interactive electronic document by said first computer to indicate a rejection state; and transmitting said interactive electronic document to said originator computer by said first computer;
   f) receiving at said first computer a third set of data from said first one of said plurality of workflow computers, wherein said third set of data indicates an unrejection of said interactive electronic document; verifying said originating computer has not modified said interactive electronic document by said first computer; modifying said state associated with said interactive electronic document by said first computer to indicate said waiting for approval state; and restoring said approval list of said interactive electronic document;
   g) receiving at said first computer a final set of data from a final one of said plurality of workflow computers, wherein said final set of data indicates approval of said interactive electronic document and said first computer has received a set of data indicating approval of said interactive electronic document from each of said plurality of workflow computers; modifying said state associated with said interactive electronic document by said first computer to indicate an approved state; and electronically processing said interactive electronic document;
   h) electronically verifying said electronic processing of the approved interactive electronic document; and
   i) electronically archiving said verified interactive electronic document.

2. The method of claim 1, wherein the step (d) further comprises:
   receiving at said first computer a fourth set of data from one of said plurality of workflow computers, wherein said fourth set of data indicates an unapprove of said interactive electronic document; and updating said approval list of said interactive electronic document by said first computer based on said fourth set of data, wherein a previous approval of said interactive electronic document is removed from said approval list based on said fourth set of data.

3. The method of claim 1, wherein the step (d) further comprises:
   receiving at said first computer a fourth set of data from said originator computer, wherein said fourth set of data indicates an unsubmit of said interactive electronic document; modifying said state associated with said interactive electronic document by said first computer to indicate an unsubmitted state;
   receiving at said first computer a resubmission of said interactive electronic document; modifying said state associated with said interactive electronic document by said first computer to indicate a submitted state; verifying no changes between an initial submission and said resubmission of said interactive electronic document; and restoring said approval list of said interactive electronic document.

4. The method of claim 1, wherein the interactive electronic document comprises at least one of: a time sheet, an expense report, an invoice, a purchase requisition, a purchase order, or a financial report.

5. The method of claim 1, wherein said first sets of data comprises up to N approval levels, where N is an integer greater than zero.

6. A method in a computer system for paperless business work-flow review and management having a plurality of approval levels, the method comprising the steps of:
   a) receiving at a workflow management computer an interactive electronic document electronically from an originator computer;

b) modifying a state of said interactive electronic document to indicate a document entry stage by said workflow management computer;
c) transmitting said interactive electronic document to a plurality of independent and parallel workflow paths from said workflow management computer based on approval and workflow requirements, wherein said plurality of independent and parallel workflow paths comprise one or more approval computers;
d) displaying a plurality of data fields of said interactive electronic document at one or more approval computers, wherein every one or more approval computers within each of said plurality of independent and parallel workflow paths displays a unique set of said plurality of data fields based on one or more predefined business rules;
e) performing the following in parallel for each said plurality of independent and parallel workflow paths:
   i) receiving at said workflow management computer one or more approval dispositions from said one or more approval computers; updating an approval list of said interactive electronic document by said workflow management computer based on said received one or more approval dispositions;
   ii) receiving at said workflow management computer an unsubmit command for said interactive electronic document from said originator computer; modifying said state of said interactive electronic document to indicate said interactive electronic document is not in the document entry stage; receiving at said workflow management computer a resubmit command; modifying said state of said interactive electronic document to indicate the document entry stage; restoring said approval list of said interactive electronic document;
f) verifying at said workflow management computer approval by all required approval computers of all said plurality of independent and parallel workflow paths; and
g) electronically processing said interactive electronic document by said workflow management computer.

7. The method of claim 6, further comprising the steps of:
h) electronically verifying by said workflow management computer said electronic processing of said approved interactive electronic document by said workflow management computer; and
i) electronically archiving said verified interactive electronic document by said workflow management computer.

8. The method of claim 6, wherein step e) further comprises:
   iii) receiving at said workflow management computer a reject disposition from one or more required approval computers;
   iv) electronically modifying said state of said interactive electronic document to indicate said reject disposition by said workflow management computer;
   v) receiving at said workflow management computer one or more unreject dispositions of a previously rejected interactive electronic document from said one or more required approval computers; and
   vi) electronically removing said reject disposition of said unrejected interactive electronic document by said workflow management computer.

9. The method of claim 8, wherein receiving the rejection disposition of step iii) further comprises:
electronically notifying said originator of said rejection disposition after receiving said rejection disposition of said interactive electronic document by said workflow management computer; and
enabling editing of said interactive electronic document at said originator computer by said workflow management computer.

10. The method of claim 6, wherein step e) further comprises:
   iii) receiving at said workflow management computer an unapprove disposition from an approval computer;
   iv) electronically removing a previously provided approval from said approval list of said interactive electronic document by said workflow management computer; and
   v) transmitting said interactive electronic document from said workflow management computer for disposition by the approval computer who previously removed approval.

11. The method of claim 6, wherein said receiving the unsubmit request of step e) ii) further comprises:
setting said interactive electronic document state to editable by said workflow management computer;
receiving any edits and a resubmission of said editable interactive electronic document by the originator computer;
maintaining approvals of said interactive electronic document if no edits of the interactive electronic document were received prior to said resubmission;
clearing all approvals of said interactive electronic document upon receipt of any edits of said interactive electronic document by said workflow management computer; and
auditing said interactive electronic document by said workflow management computer.

12. The method of claim 6, wherein said receiving the unsubmit request of step e) ii) further comprises at least one of:
setting said interactive electronic document state to editable by said workflow management computer;
clearing by said workflow management computer any previously received approvals of said interactive electronic document upon resubmission and after receipt of any edits of said interactive electronic document;
preventing a resubmission by the originator computer of the editable interactive electronic document by said workflow management computer;
auditing said interactive electronic document by said workflow management computer;
saving a successfully audited interactive electronic document by said workflow management computer;
enabling submission of a saved interactive electronic document by said workflow management computer; or
maintaining any previously received approvals of said interactive electronic document upon resubmission and after receipt of no edits of said interactive electronic document by said workflow management computer.

13. The method of claim 6, wherein the interactive electronic document comprises at least one of a time sheet, an expense report, an invoice, a purchase requisition, a purchase order, or a financial report.

14. The method of claim 6, wherein the interactive electronic document comprises a time sheet comprising a plurality of time entries, and wherein the plurality of time entries are approved at least one of in parallel, or in order.

15. A non-transitory computer-usable storage medium having computer-executable instructions for execution by a processing system, said computer-executable instructions when executed perform the following steps:

receiving at a first computer an interactive electronic document from an originator computer; modifying a state associated with said interactive electronic document by said first computer to indicate a waiting for approval state, wherein said waiting for approval state prohibits editing of said interactive electronic document; and concurrently transmitting to a plurality of workflow computers said interactive electronic document from said first computer;

concurrently receiving at said first computer a first set of data from a plurality of said plurality of workflow computers, wherein said first set of data indicates an approval of said interactive electronic document updating an approval list of said interactive electronic document by said first computer based on said first set of data, wherein said approval list comprises a list of all received approvals of said interactive electronic document;

receiving at said first computer a second set of data from a first workflow computer, wherein said first workflow computer comprises one of said plurality of workflow computers and wherein said second set of data indicates a rejection of said interactive electronic document; modifying said state associated with said interactive electronic document by said first computer to indicate a rejection state; and transmitting said interactive electronic document to said originating computer by said first computer;

receiving at said first computer a third set of data from said first workflow computer, wherein said third set of data indicates an unrejection of said interactive electronic document; verifying said originating computer has not modified said interactive electronic document by said first computer; modifying said state associated with said interactive electronic document by said first computer to indicate said waiting for approval state; and restoring said approval list of said interactive electronic document receiving at said first computer a final set of data from a final workflow computer, wherein said final set of data indicates approval of said interactive electronic document and said first computer has received a set of data indicating approval of said interactive electronic document from each of said plurality of workflow computers; modifying said state associated with said interactive electronic document by said first computer to indicate an approved state; and electronically processing said interactive electronic document;

electronically verifying said electronic processing of said approved interactive electronic document; and electronically archiving said verified interactive electronic document.

16. A method in a computer system for paperless business work-flow review and management comprising:
a) receiving a submit request of an electronic document at a workflow computing device from an originator computing device;
b) tracking using said workflow computing device said electronic document through an approval process, wherein said approval process comprises multiple levels and parallel approvals;
c) receiving one or more approver actions of said electronic document in parallel from one or more approver devices, said approver actions comprising:
an approval,
an unapproval,
a rejection, and
an unrejection;
d) receiving an unsubmit request and any edits of said electronic document from said originator computing device, wherein said unsubmit request removes said electronic document from said document entry stage;
e) receiving a resubmit request of said electronic document from said originator computing device;
f) processing said resubmit request comprising:
maintaining any previously received said approver actions where no said any edits were received from said originator device, and
clearing said any previously received approver actions where said any edits were received from said originator device;
g) determining whether all approvers have selected said approval approver action;
h) processing said electronic document when all of said approvers have been determined to have selected said approval approver action; and
i) archiving said electronic document and said approver actions.

17. The method of claim 16, wherein said receiving said approval approver action indicates an approval by a given approver of the electronic document received from the given approver.

18. The method of claim 16, wherein said receiving said unapproval approver action indicates removal of a previously received approval of the electronic document.

19. The method of claim 16, wherein said receiving said rejection approver action indicates a rejection by a given approver of the electronic document received from the given approver.

20. The method of claim 16, wherein said receiving said unrejection approver action indicates removal of a previously received rejection of the electronic document.

21. The method of claim 16, wherein said approver actions by a given approver are independent of actions by another approver.

22. The method of claim 16, wherein said approver actions by a given approver are tracked separately from actions by another approver.

23. The method of claim 16, wherein said approver actions by a given approver do not affect said approver actions by another approver.

* * * * *